United States Patent
Chari et al.

(10) Patent No.: US 9,264,451 B2
(45) Date of Patent: Feb. 16, 2016

(54) GENERATION OF ATTRIBUTE BASED ACCESS CONTROL POLICY FROM EXISTING AUTHORIZATION SYSTEM

(71) Applicant: International Business Machines Corporation, Armonk, NY (US)

(72) Inventors: Suresh N. Chari, Tarrytown, NY (US); Ian M. Molloy, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/474,747

(22) Filed: Sep. 2, 2014

(65) Prior Publication Data

US 2015/0082377 A1 Mar. 19, 2015

Related U.S. Application Data

(60) Provisional application No. 61/878,644, filed on Sep. 17, 2013.

(51) Int. Cl.
*H04L 29/06* (2006.01)
*G06N 99/00* (2010.01)

(52) U.S. Cl.
CPC .............. *H04L 63/20* (2013.01); *G06N 99/005* (2013.01)

(58) Field of Classification Search
CPC ............................... H04L 63/20; G06N 99/005
USPC ............................................................. 726/1
See application file for complete search history.

(56) References Cited

U.S. PATENT DOCUMENTS

| 8,024,771 | B2 * | 9/2011 | Malkin | G06F 21/40 713/165 |
| 2009/0205018 | A1 * | 8/2009 | Ferraiolo | H04L 63/102 726/1 |
| 2009/0210544 | A1 * | 8/2009 | Lee | H04L 63/10 709/229 |
| 2011/0107428 | A1 * | 5/2011 | Yadav | H04L 63/0428 726/26 |
| 2011/0145589 | A1 * | 6/2011 | Camenisch | G06F 21/6227 713/185 |

OTHER PUBLICATIONS

P.E. Hart et al., "A Formal Basis for the Heuristic Determination of Minimum Cost Paths," IEEE Transactions of Systems Science and Cybernetics, Jul. 1968, pp. 100-107, vol. SSC-4, No. 2.

* cited by examiner

*Primary Examiner* — Michael S McNally
(74) *Attorney, Agent, or Firm* — Jeff LaBaw; Ryan, Mason & Lewis, LLP

(57) ABSTRACT

Attributes relevant to at least one existing authorization system are identified. Noise removal from identified attributes of the at least one existing authorization system is performed. An attribute based access control (ABAC) policy is generated from remaining identified attributes to derive logical rules that grant or deny access.

25 Claims, 3 Drawing Sheets

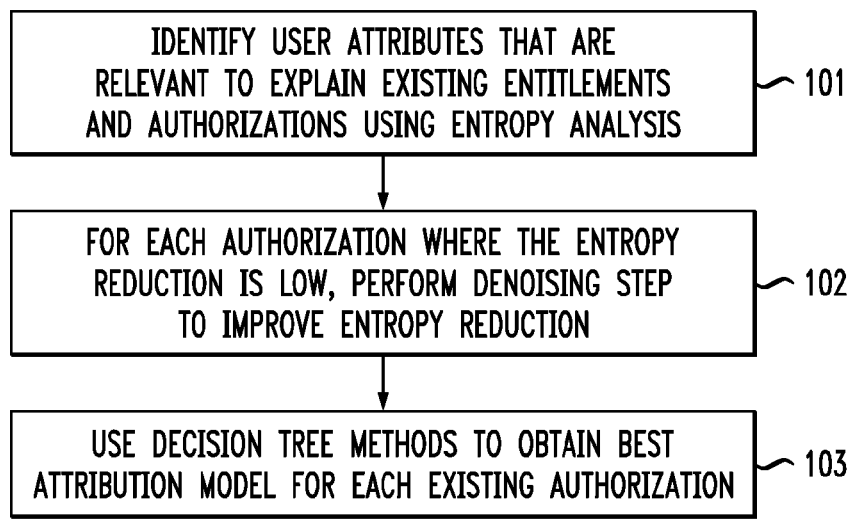
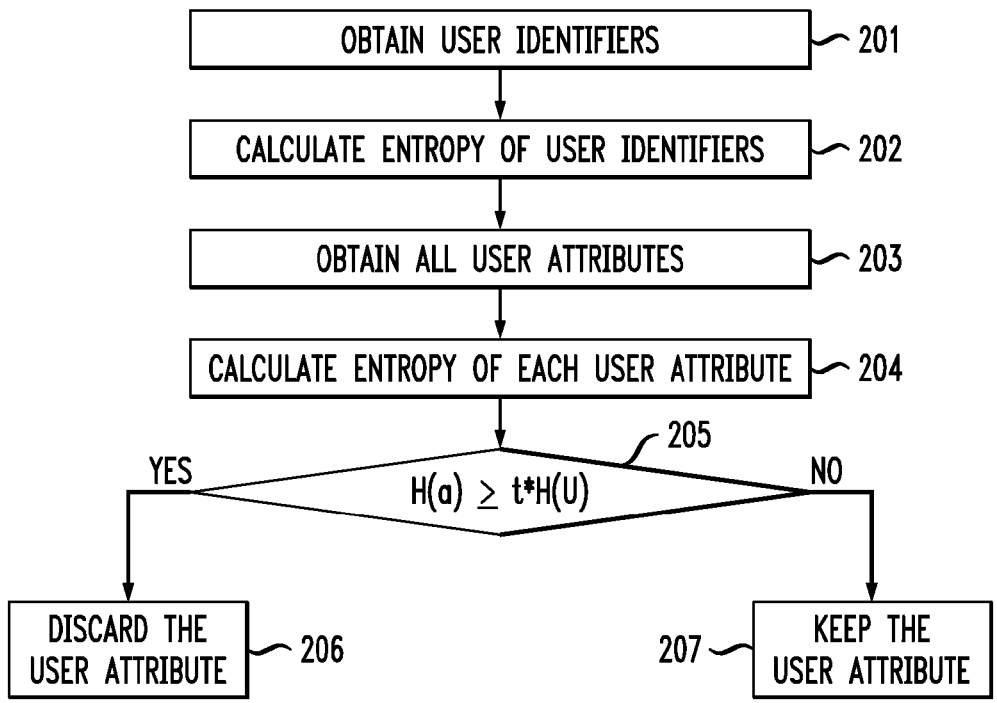

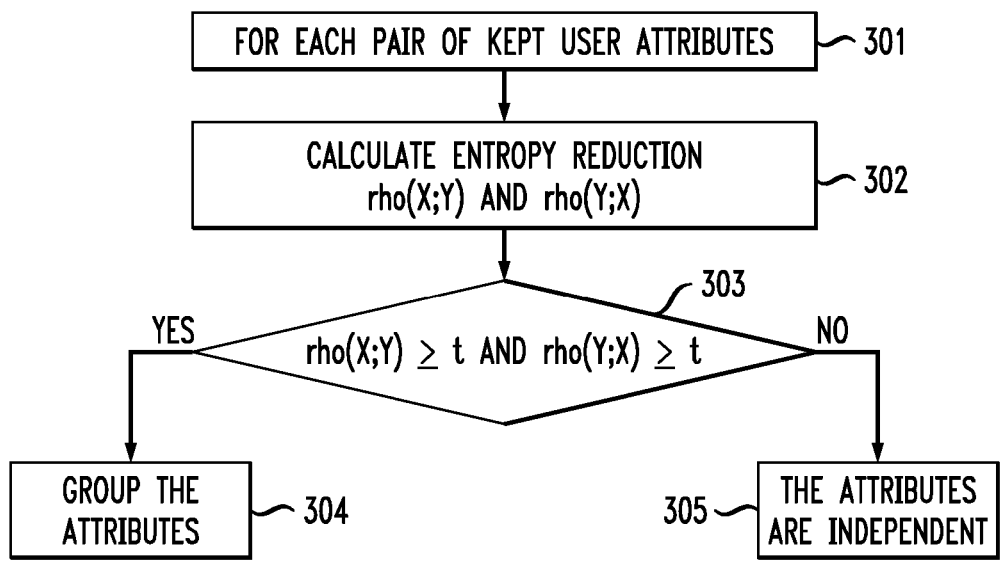
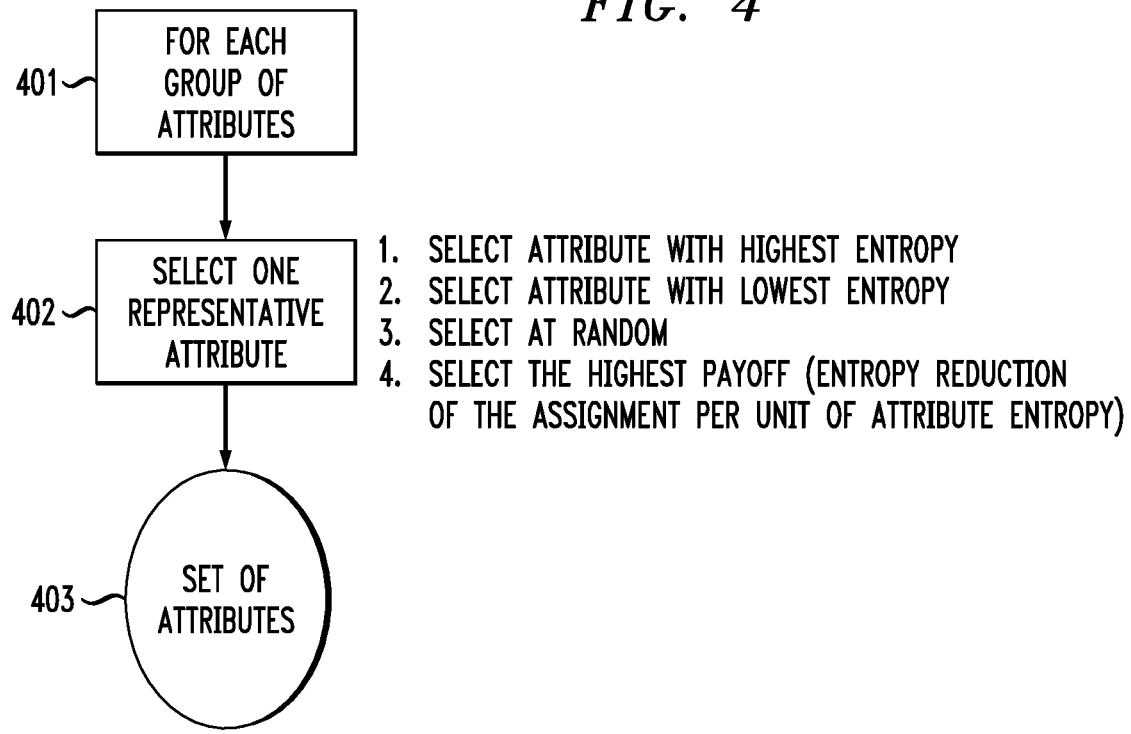

GENERATION OF ATTRIBUTE BASED ACCESS CONTROL POLICY FROM EXISTING AUTHORIZATION SYSTEM

CROSS REFERENCE TO RELATED APPLICATION

The present application claims priority to the U.S. Provisional Patent Application identified by Ser. No. 61/878,644, filed on Sep. 17, 2013, and entitled "Generating Attribute Based Access Control Policies from Existing Identity Management Systems," the disclosure of which is incorporated by reference herein in its entirety.

FIELD

The field generally relates to access control and, more particularly, to attribute based access control.

BACKGROUND

Access control requires effective (correct) and timely policies which should relate the need for access to sensitive resources to be protected. There are existing models to provide access control with minimal administrative overhead. One of the simplest models is to directly assign permissions to users. However, such policies are large, and difficult to manage in dynamic environments. Newer policy models, such as role based access control (RBAC) that groups permissions into roles and assigns roles to users, have been developed to address the issues with prior work. While newer models decrease the administrative costs, they still require administrative actions to make changes to policies as needs change.

Attribute based access control (ABAC) is a popular model that grants access to users based on the attributes of the user and the request, such as the attributes of the permission and resources. As the attributes of the users change, access can be automatically granted. As resources are added, users with the required attributes are automatically granted access, making administration easier and more cost effective. ABAC requires a policy. Currently, such policies must be manually defined and written.

SUMMARY

Illustrative embodiments of the invention provide techniques for improved attribute based access control.

For example, in one embodiment, a method comprises the following steps. Attributes relevant to at least one existing authorization system are identified. Noise removal (e.g., of at least one of noisy assignments and noisy attributes) from identified attributes of the at least one existing authorization system is performed. An attribute based access control (ABAC) policy is generated from remaining identified attributes to derive logical rules that grant or deny access.

Advantageously, illustrative embodiments of the invention mine/derive attribute based access control policies from policies that are deployed in existing identity and access management (IAM) systems (example of an existing authorization system), and account for noise and errors in the deployed data.

These and other objects, features, and advantages of the present invention will become apparent from the following detailed description of illustrative embodiments thereof, which is to be read in connection with the accompanying drawings.

BRIEF DESCRIPTION OF THE DRAWINGS

FIG. 1 illustrates a policy generation methodology according to an embodiment of the invention.

FIG. 2 illustrates a user attribute identification methodology according to an embodiment of the invention.

FIG. 3 illustrates an attribute grouping methodology according to an embodiment of the invention.

FIG. 4 illustrates an attribute selection methodology for policy derivation according to an embodiment of the invention.

DETAILED DESCRIPTION

Figure 5:
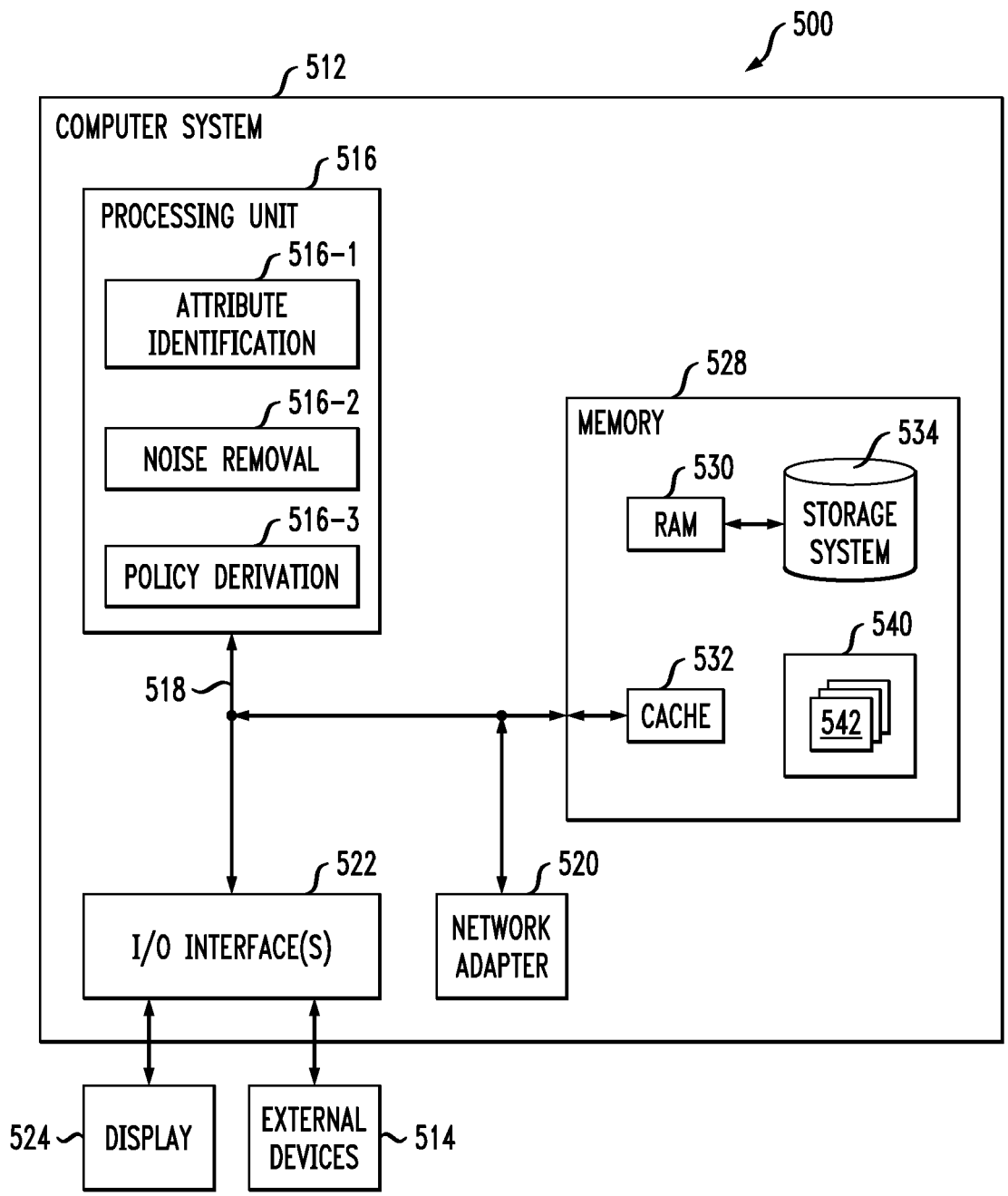
FIG. 5 illustrates a computer system for implementing one or more steps and/or components in accordance with one or more embodiments of the invention.

Illustrative embodiments will be described herein in the context of illustrative methods, apparatus, articles of manufacture, and systems for providing attribute based access control functions. It is to be appreciated, however, that embodiments of the invention are not limited to the specific methods, apparatus, articles of manufacture, and systems illustratively shown and described herein. Rather, embodiments of the invention are directed broadly to attribute based access control techniques that would benefit from accounting for noise and errors in the deployed data. For this reason, numerous modifications can be made to the embodiments shown that are within the scope of the present invention. That is, no limitations with respect to the specific embodiments described herein are intended or should be inferred.

There is no general approach for automatically generating ABAC policies from existing, deployed access control and identity and access management (IAM) data, however there are approaches to generate (mine) role-based access control policies that leverage user attributes. Such methods attempt to define roles such that the assigned users have similar attributes, or that the user membership can be defined using attributes for future assignments. The fundamental issue is that the deployed IAM data is often noisy, and contains errors, missing values, stale data, etc. Moreover, existing approaches fail to adequately address these issues. Finally, RBAC policies cannot be easily migrated to ABAC policies.

An illustrative embodiment of the invention mines attribute based access control policies from policies that are deployed in existing IAM systems, and accounts for noise and errors in the deployed data. Main steps to the mining process are:

1. identification of attributes relevant to existing authorization or privileges/permissions/groups, etc.;
2. removal of noisy assignments and/or attributes; and
3. mining of the ABAC policy to derive logical rules that grant or deny access. Some advantages of illustrative embodiments are that:
   the techniques work with any existing deployed policy (e.g., direct entitlements, group assignments, RBAC policies, hierarchies, etc.);
   the data can be derived from any form, such as deployed policy specifications, access request logs and decisions;
   the attributes can be arbitrary user attributes with no a priori domain knowledge;
   the attribute and policy specifications can be noisy and contain errors;
   the logs can be monitored and policy changes suggested; and
   the techniques are scalable and parallelizable and can assist with past and future provisioning and identify errors without requiring a migration to ABAC.

FIG. 1 shows a policy generation methodology according to embodiment of the invention.

Step 101 identifies user attributes relevant to existing authorization systems. The user attributes that are identified are relevant to explain existing entitlements and authorizations associated with the system. Well-known entropy analysis may be used to perform this step, see, e.g., T. M. Cover et al., *Elements of information theory* (99th ed.), New York: Wiley, 1991.

Step 102 performs noise removal of noisy assignments and/or attributes. More particularly, for each authorization where the entropy reduction is low (e.g., below a given threshold), a denoising operation is performed to improve entropy reduction.

Step 103 mines an ABAC policy to derive logical rules that grant or deny access to a subject system. The results are presented to an administrator with domain knowledge and new assignments. More particularly, well-known decision tree methodologies can be used to obtain a sufficient (e.g., best) attribution model for each existing authorization. Decision tree methodologies that can be employed are described, for example, in L. Rokach et al., *Data mining with decision trees: theory and applications*, World Scientific Pub Co Inc., 2008; and J. R. Quinlan, C4.5: *Programs for Machine Learning*. Morgan Kaufmann Publishers Inc., San Francisco, Calif., USA, 1993.

FIG. 2 shows a user attribute identification methodology according to embodiment of the invention. To identify the attributes relevant to existing authorization systems, the following steps may be taken in accordance with the illustrative embodiment of FIG. 2.

Step 201 obtains user identifiers.
Step 202 calculates entropy of the obtained user identifiers.
Step 203 obtains user attributes.
Step 204 calculates entropy of the obtained user attributes to identify attributes that are relevant for determining authorizations. It should be noted that there is a sub-goal to produce ABAC policies that are simple, containing few rules or short rules, and that can be generalized to future requests (i.e., rules that do not over fit the data).

To identify such attributes, the following process may be used:

(1) Calculate the amount of entropy (Shannon entropy, 5) in a unique user identifier (at step 202). For a system with N users, this is:

U is a set of users (where x is an instance of U), an attribute of a user is a key-value pair where the set of attributes is A (where a is an instance of A). For example, an attribute $a \in A$ might be "Dept". We can also say there exists an attribute mapping that maps users and attribute keys to values, $U \times A \rightarrow V$.

$$S = \log \frac{1}{N}$$

(2) Select all attributes without discrimination (at step 202). Any a priori known unique identifiers should be omitted (e.g., user ID, email, etc.)

(3) Calculate the entropy for each attribute (at step 204):

$$S_A = H(A) = \sum_{a \in A} Pr(a) \log Pr(a)$$

Drop any attribute with high entropy (entropy proportional to the user identifiers). For example, $S_A \geq t^*S$. If $H(a) \geq t^*H(U)$ as determined in step 205, the user attribute is discarded at step 206 and if $H(a) < t^*H(U)$, the user attribute is kept at step 207.

(4) Group attributes that are equivalent (high co-mutual entropy) as shown in the illustrative embodiment of FIG. 3.

For each pair of kept user attributes, at step 301, calculate the entropy reduction $\rho(X;Y)$ for an attribute X when an attribute Y is known, at step 302:

$$H(X|Y)=H(X,Y)-H(Y)$$

$$I(X;Y)=H(X)-H(X|Y)$$

$$\rho(X;Y)=I(X;Y)/H(X).$$

If $\rho(X;Y) \geq t$ and $\rho(Y;X) \geq t$, as determined in step 303, then adding Y to X (or X to Y) adds little information, and the two attributes are considered to be redundant, and the attributes are grouped together, at step 304. Otherwise, the attributes are considered independent, at step 305. Select one attribute from each group based on some criteria, such as max entropy, min entropy, or return on investment (entropy reduction of the authorizations per unit of attribute entropy, described below).

(5) Remove any attributes with very low (e.g., 0.01%) entropy reduction.

For each authorization Z, calculate the entropy reduction conditioned on each attribute X:

$$\rho(Z;X).$$

If the entropy reduction is below a threshold t, then the attribute is not meaningful and can be pruned.

(6) Remove operational attributes. Domain knowledge can be applied to remove any operational attributes, such as statistics of user behavior (e.g., log-on count, last log-on time) or authorizations (e.g., date created, last modification date, etc.). Such attributes may also be identified based on their high entropy over time.

(7) Take all combinations of the remaining attributes, at step 401, in FIG. 4. For the remaining sets of attributes, entropy reductions for all elements of the power set can be evaluated. A power set is the set of all subsets of a set of elements. For example, the set {1,2,3} has power set {{ },{1},{2},{3},{1,2},{2,3},{1,2,3}}. Step 402 shows selecting one representative attribute from each group by, for example, selecting an attribute with the highest entropy, selecting an attribute with the lowest entropy, selecting at random, or selecting an attribute with the highest payoff (i.e., entropy reduction of the assignment per unit of attribute entropy). The resulting set of attributes, at step 403, represents the derived access policy. When the power set is prohibitively large, pruning and advanced search can be applied to find a subset that most closely matches the entropy reduction of all attributes while limiting the number of attributes or total attribute entropy. For example, the A* search algorithm may be employed, see, e.g., P. E. Hart et al., "A Formal Basis for the Heuristic Determination of Minimum Cost Paths," *IEEE Transactions on Systems Science and Cybernetics SSC*4 4 (2): 100-107, 1968.

One of several noise removal techniques can be applied to the data, for example, using classifiers and generalization or using matrix and tensor decomposition, as detailed below.

(1) Classifiers and Generalization

For each authorization, break the user set into two populations (training and testing) randomly, each of which contains users who have been both granted and denied access. Next, using the authorization decisions as labels, train a machine learning classifier on the data. For example, a support vector machine (SVM) or logistic regression (LR) can be used. The classifier can be cross validated (between the training and testing set and training on many, e.g., 10, independent disjoint subsets). The best classifier may be selected and used for noise removal. When the classifier returns a decision contrary to the IAM system, a potential error is identified and the system administrator should be notified or queried. The attributes selected for the classifier should be those selected the attribute selection step.

(2) Matrix and Tensor Decomposition

The classifier approach attempts to identify errors on a by-authorization basis by building a classifier. Alternatively, the access policies as a whole may be evaluated.

2a) In matrix factorization, an access control matrix X is decomposed into two sub-matrices A, $B^T$ such that:

$$X \approx A \times B^T$$

Here, one dimension of X is the set of users, while the other is the set of authorizations. By selecting a low rank matrix, the approximation will have reduced entropy, and reduced noise. By withholding some values of the matrix, the approximation accuracy may be evaluated. In collective matrix factorization, multiple relations are decomposed concurrently, i.e., the authorization matrix, and one per user or resource attribute.

2b) Tensor decomposition. A tensor (multidimensional matrix) can be defined such that one dimension is the set of users, a second dimension is the set of authorizations, and the remaining dimensions are attributes of the users and resources. The tensor may be decomposed into an approximation similar to collective matrix factorization, and the differences between the approximation and IAM system are the identified errors.

Next, the system performs mining of the ABAC policy. The attributes of users and resources are input into a decision tree mining algorithm, where the result of the access control decision is known (obtained from the IAM system). Any known decision tree mining algorithm is sufficient as long as it does the following tasks:

User or resource attributes are progressively selected that refine the decision, where the leaf nodes contain a majority of allow or deny decisions. As new attributes are added, the entropy of the leaf nodes is reduced. When the entropy cannot be reduced further (or the attributes selected in the first step have been exhausted), the process stops.

Deriving ABAC rules from the decision tree can be performed by traversing the tree from the root to leaf nodes. A post-processing operation clusters together rules that follow similar paths from root to leaf nodes. For example, when user and resource attributes are highly correlated in the leaf nodes, generalizations to the rules can be applied. For example, if a rule has DEPT=security for a user and LABEL=security for a resource, the rule may be abstracted to DEPT=LABEL. The merged rules should be evaluated and validated such that they do not introduce significant errors.

Finally, the results are output and may be validated by a domain expert or administrator. The decisions obtained from the noise removal and decision tree steps with the highest uncertainty can be presented to the administrator first (used as a sorting criteria) to reduce the cognitive load on the administrator.

Embodiments can work with any existing deployed policy (e.g., direct entitlements, group assignments, RBAC policies, hierarchies, etc.). Moreover, even if the attribute and policy specifications are noisy and contain errors, embodiments can derive an ABAC policy. In addition, logs can be monitored and policy changes suggested. Embodiments process is scalable and parallelizable, can assist with past and future provisioning, and can identify errors without requiring a migration to ABAC.

Embodiments of the invention can be used in many applications where it is desirable to migrate to an ABAC system from a non-ABAC system. One example is when the existing access control policy is large and difficult to manage or maintain. Other possible use cases include producing a unified access control policy after a merger of acquisition of two or more IAM systems. The system can also be used to optimize an existing ABAC system to produce fewer or more compact rules.

It is to be appreciated that embodiments of the invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more embodiments can make use of software running on a general-purpose computer or workstation. With reference to FIG. 5, in a computing node 500 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computing node 500 is shown in the form of a general-purpose computing device. The components of computer system/server 512 may include, but are not limited to, one or more processors or processing units 516, a system memory 528, and a bus 518 that couples various system components including system memory 528 to processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 512 typically includes a variety of computer system readable media. Such media may be any available media that is accessible by computer system/server 512, and it includes both volatile and non-volatile media, removable and non-removable media.

The system memory 528 can include computer system readable media in the form of volatile memory, such as random access memory (RAM) 530 and/or cache memory 532. The computer system/server 512 may further include other removable/non-removable, volatile/nonvolatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As depicted and described herein, the memory 528 may include at least one program product having a set (e.g., at least one) of program modules that are configured to carry out the functions of embodiments of the invention. A program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. By way of example only, certain program modules 542 are shown as executing in processing unit 516, e.g., attribute identification module 516-1, noise removal module 516-2, and policy derivation module 516-3. It is to be appreciated that more or less program modules may execute in processing unit 516.

Computer system/server 512 may also communicate with one or more external devices 514 such as a keyboard, a pointing device, a display 524, etc., one or more devices that enable a user to interact with computer system/server 512, and/or any devices (e.g., network card, modem, etc.) that enable computer system/server 512 to communicate with one or more other computing devices. Such communication can occur via input/output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
   identifying attributes relevant to at least one existing authorization system;
   performing noise removal from the identified attributes of the at least one existing authorization system; and
   generating an attribute based access control (ABAC) policy from remaining identified attributes to derive logical rules that grant or deny access;
   wherein one or more of the identifying, performing, and generating steps are performed by at least one computing node comprising a processor operatively coupled to a memory.

2. The method of claim 1, further comprising outputting the ABAC policy rules for administrative review.

3. The method of claim 1, wherein identifying attributes further comprises calculating an amount of entropy in a unique user identifier.

4. The method of claim 3, wherein identifying attributes further comprises selecting a set of attributes without discrimination.

5. The method of claim 4, wherein identifying attributes further comprises calculating entropy for each attribute of the set of attributes.

6. The method of claim 5, wherein identifying attributes further comprises grouping attributes that are equivalent.

7. The method of claim 6, wherein identifying attributes further comprises calculating entropy reduction for each attribute.

8. The method of claim 7, wherein identifying attributes further comprises removing any attributes with entropy reduction below a given value and any operational attributes.

9. The method of claim 8, wherein identifying attributes further comprises, using combinations of the remaining attributes, calculating a subset that maximizes the entropy reduction of permission assignments while limiting the number of attributes or total attribute entropy.

10. The method of claim 3, wherein known unique identifiers are omitted from the set of attributes.

11. The method of claim 3, further comprising dropping any attribute with entropy above a given value.

12. The method of claim 1, wherein noise removal comprises using classifiers.

13. The method of claim 1, wherein noise removal comprises using generalizations.

14. The method of claim 1, wherein noise removal comprises using matrix factorization.

15. The method of claim 1, wherein noise removal comprises using tensor decomposition.

16. The method of claim 1, wherein noise removal comprises removing at least one of noisy assignments and noisy attributes.

17. The method of claim 1, wherein mining an ABAC policy comprises inputting attributes of users and resources into a decision tree mining algorithm and analyzing the decision tree.

18. A computer program product comprising a computer-readable storage medium having encoded therein executable code of one or more software programs, wherein the one or more software programs when executed by at least one processor associated with a computing node implement steps of:
   identifying attributes relevant to at least one existing authorization system;
   performing noise removal from the identified attributes of the at least one existing authorization system; and
   generating an attribute based access control (ABAC) policy from remaining identified attributes to derive logical rules that grant or deny access.

19. An apparatus, comprising:
   a memory; and
   at least one processor operatively couple to the memory and configured to:
   identify attributes relevant to at least one existing authorization system;
   perform noise removal from the identified attributes of the at least one existing authorization system; and
   generate an attribute based access control (ABAC) policy from remaining identified attributes to derive logical rules that grant or deny access.

20. The apparatus of claim 19, wherein the at least one processor is further configured to output the ABAC policy rules for administrative review.

21. The apparatus of claim 19, wherein identifying attributes further comprises one or more of:

calculating an amount of entropy in a unique user identifier;
selecting a set of attributes without discrimination;
calculating entropy for each attribute of the set of attributes;
grouping attributes that are equivalent;
calculating entropy reduction for each attribute;
removing any attributes with entropy reduction below a given value and any operational attributes; and
using combinations of the remaining attributes, calculating a subset that most closely matches the entropy reduction of attributes while limiting the number of attributes or total attribute entropy.

22. The apparatus of claim 21, wherein known unique identifiers are omitted from the set of attributes.

23. The apparatus of claim 21, wherein the at least one processor is further configured to drop any attribute with entropy above a given value.

24. The apparatus of claim 19, wherein noise removal comprises using at least one of classifiers, generalizations, matrix factorization, and tensor decomposition.

25. The apparatus of claim 19, wherein mining an ABAC policy comprises inputting attributes of users and resources into a decision tree mining algorithm and analyzing the decision tree.

* * * * *